United States Patent
Chen et al.

(10) Patent No.: US 10,748,221 B2
(45) Date of Patent: *Aug. 18, 2020

(54) APPLICATION SERVICE AGGREGATION AND MANAGEMENT

(71) Applicant: INTERNATIONAL BUSINESS MACHINES CORPORATION, Armonk, NY (US)

(72) Inventors: Jianwen Chen, Oatley (AU); Margarete Donovang-Kuhlisch, Lohmar (DE); Robert J. Faferko, Singapore (SG); Ya Xiao Liu, Beijing (CN); Yan Pang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/696,336

(22) Filed: Sep. 6, 2017

(65) Prior Publication Data

US 2017/0365009 A1  Dec. 21, 2017

Related U.S. Application Data

(63) Continuation of application No. 14/302,496, filed on Jun. 12, 2014, now Pat. No. 9,760,952.

(51) Int. Cl.
*G06Q 40/00* (2012.01)
*G06Q 10/06* (2012.01)
*G06F 9/50* (2006.01)

(52) U.S. Cl.
CPC .......... *G06Q 40/12* (2013.12); *G06F 9/5072* (2013.01); *G06Q 10/063* (2013.01); *G06Q 40/10* (2013.01)

(58) Field of Classification Search
CPC ....... G06Q 40/10; G06Q 40/12; G06Q 10/063
USPC ................................................... 705/30, 7.11
See application file for complete search history.

(56) References Cited

U.S. PATENT DOCUMENTS

| | | | |
|---|---|---|---|
| 6,629,083 B1 | 9/2003 | Morton | |
| 7,324,972 B1 | 1/2008 | Oliver et al. | |
| 8,069,242 B2 | 11/2011 | Hadar et al. | |
| 8,984,589 B2 | 3/2015 | Liu | |
| 9,075,788 B1 | 7/2015 | Roth et al. | |
| 2004/0117311 A1 | 6/2004 | Agarwal et al. | |
| 2008/0300997 A1 | 12/2008 | Dawson et al. | |
| 2010/0100525 A1 | 4/2010 | Huang | |
| 2010/0131624 A1 | 5/2010 | Ferris | |
| 2012/0117183 A1 | 5/2012 | Wong et al. | |

(Continued)

OTHER PUBLICATIONS

Friedman, Mark J.; List of IBM Patents or patent Applications Treated as Related; Sep. 5, 2017; 1 page.

(Continued)

*Primary Examiner* — Florian M Zeender
*Assistant Examiner* — Christopher R Buchanan
(74) *Attorney, Agent, or Firm* — Schmeiser, Olsen & Watts; Mark C. Vallone

(57) ABSTRACT

A method and system for aggregating services is provided. The method includes receiving and processing a service request. The service request is submitted to a service catalog and dispatched to a data integration and API module. The service request is transmitted to a management module and processed with respect to a plurality of service providers. Inter process communications associated with the service request are managed. Additionally, an account associated with the service request and the plurality of service providers is managed.

20 Claims, 8 Drawing Sheets

(56) References Cited

U.S. PATENT DOCUMENTS

| | | |
|---|---|---|
| 2012/0204169 A1 | 8/2012 | Breiter et al. |
| 2012/0290460 A1 | 11/2012 | Curry, Jr. et al. |
| 2013/0019015 A1 | 1/2013 | Devarakonda et al. |
| 2013/0091557 A1 | 4/2013 | Gurrapu |
| 2013/0311778 A1 | 11/2013 | Cherukuri et al. |
| 2015/0363246 A1 | 12/2015 | Chen et al. |

OTHER PUBLICATIONS

Friedman, Mark J.; Updated List of IBM Patents or Patent Applications Treated as Related; May 25, 2018; 1 page.

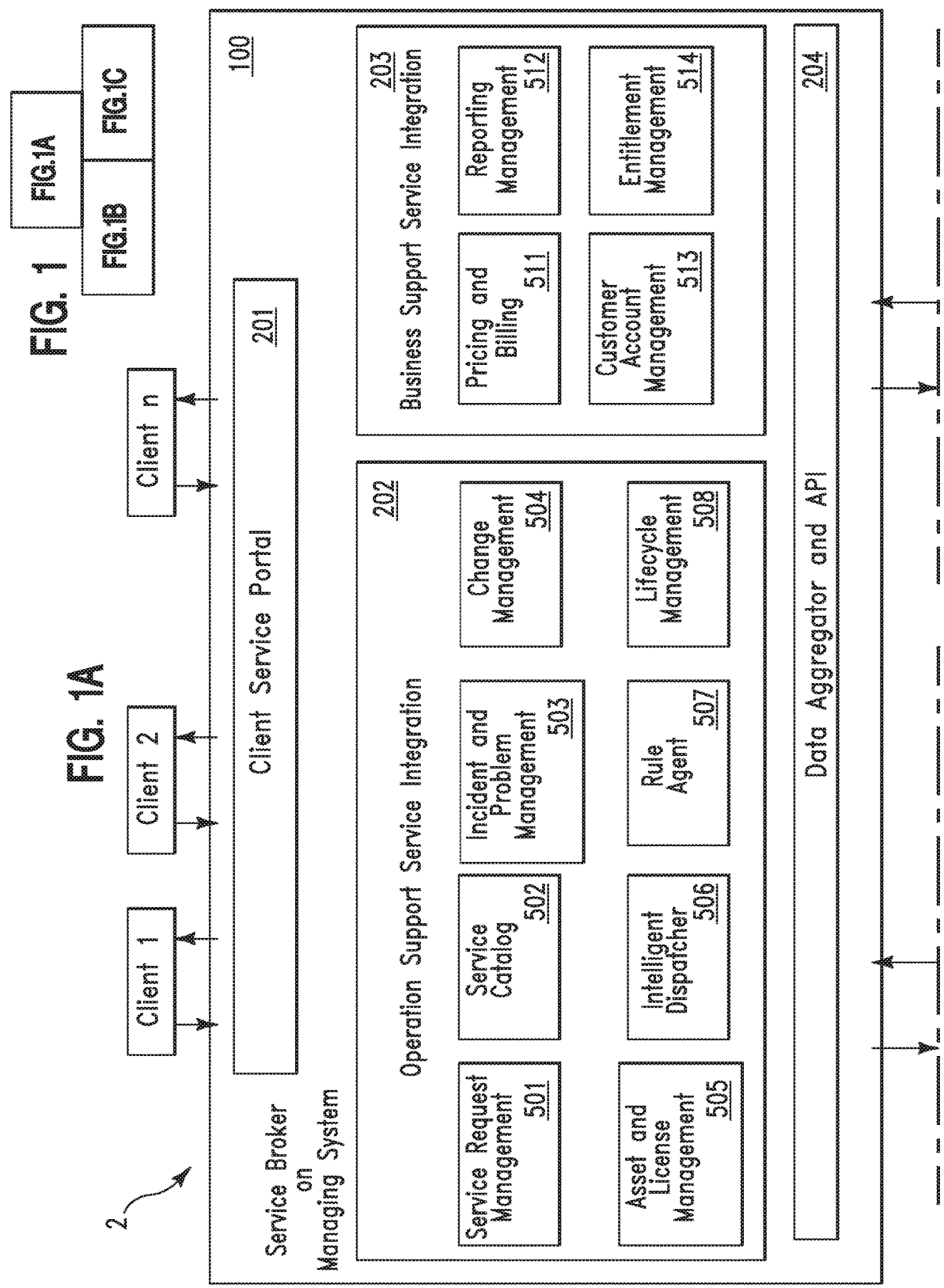

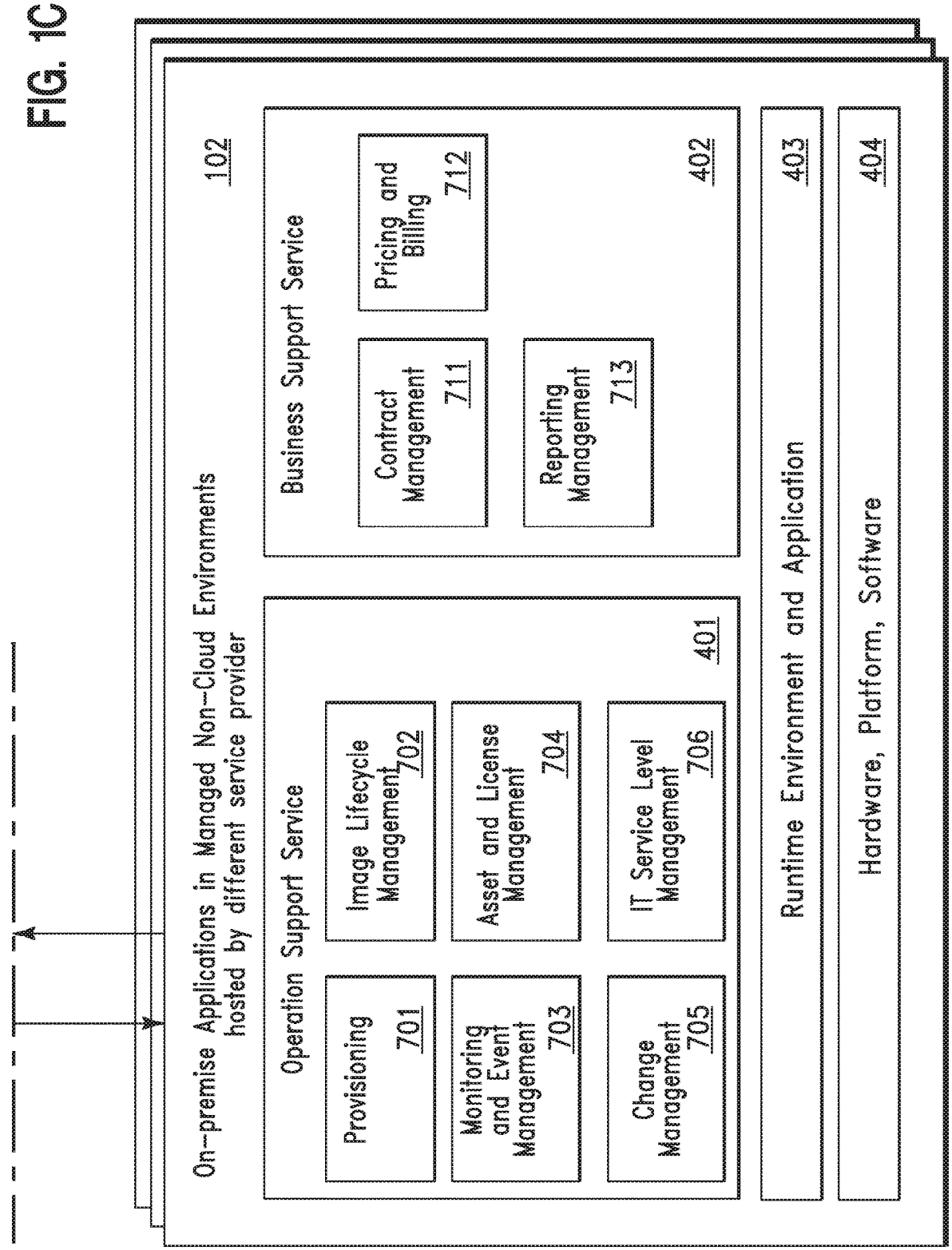

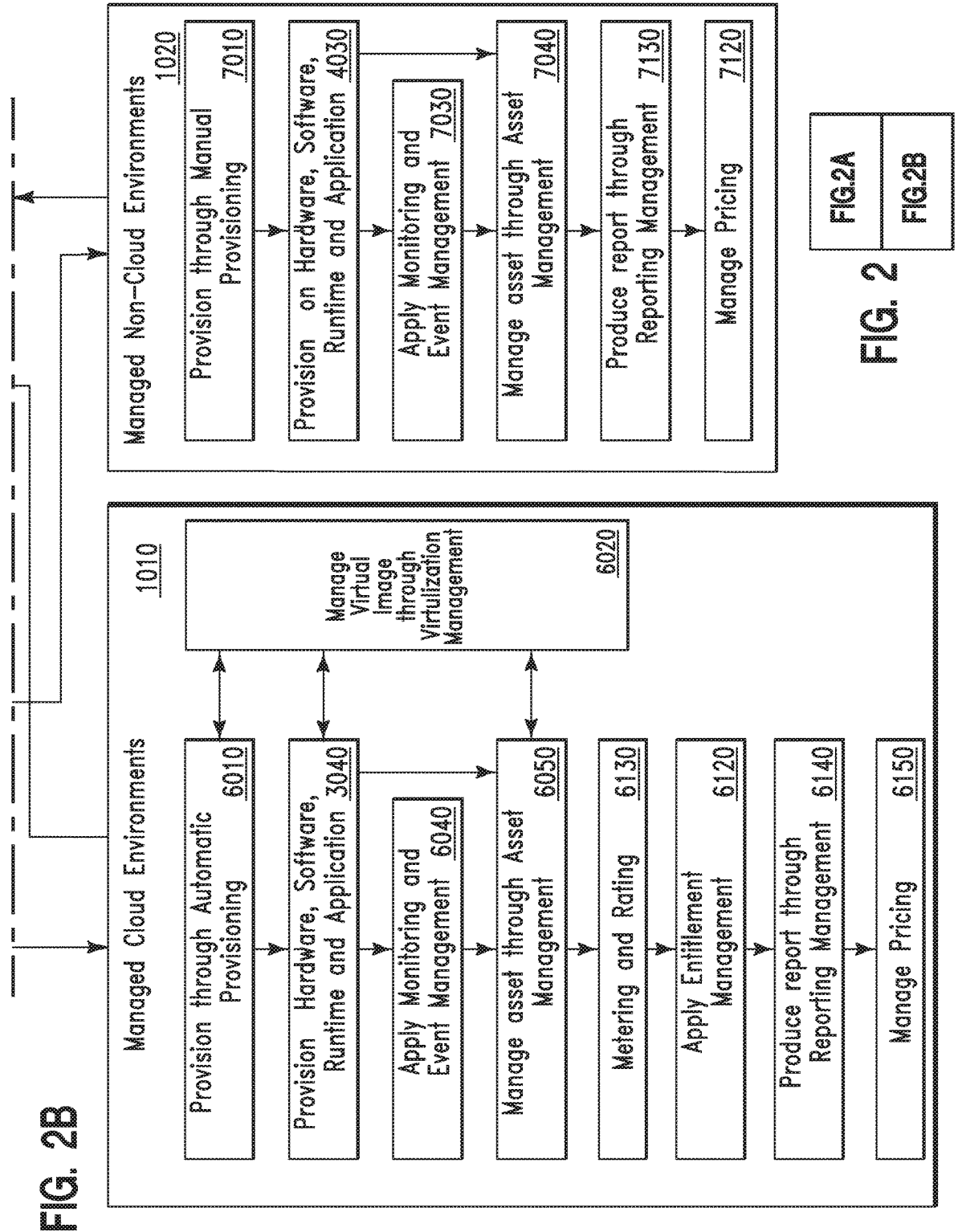

APPLICATION SERVICE AGGREGATION AND MANAGEMENT

This application is a continuation application claiming priority to Ser. No. 14/302,496 filed Jun. 12, 2014, now U.S. Pat. No. 9,760,952 issued Sep. 12, 2017.

FIELD

The present invention relates generally to a method for aggregating and managing applications and services and in particular to a method and associated system for enabling operational support services and business support services.

BACKGROUND

Combining services typically includes an inaccurate process with little flexibility. Managing software application services may include a complicated process that may be time consuming and require a large amount of resources. Accordingly, there exists a need in the art to overcome at least some of the deficiencies and limitations described herein above.

SUMMARY

A first aspect of the invention provides a method comprising: receiving, by a computer processor of a computing system, a service request associated with an application, a product, or a service; processing, by the computer processor executing a service request module, the service request; submitting, by the computer processor, the service request to a service catalog; retrieving, by the computer processor from the service catalog, the service request and associated service provider attributes; dispatching, by the computer processor executing a mathematical optimization model, the service request to a data integration and API module; transmitting, by the computer processor executing the data integration and API module, the service request to a management module associated with a plurality of service providers; processing, by the computer processor executing the management module, the service request with respect to the plurality of service providers; managing, by the computer processor based on results of the processing the service request with respect to the plurality of service providers, inter process communications (IPC) associated with the service request; and managing, by the computer processor based on the IPC, an account associated with the service request and the plurality of service providers.

A second aspect of the invention provides a computing system comprising a computer processor coupled to a computer-readable memory unit, the memory unit comprising instructions that when executed by the computer processor implements a method comprising: receiving, by the computer processor, a service request associated with an application, a product, or a service; processing, by the computer processor executing a service request module, the service request; submitting, by the computer processor, the service request to a service catalog; retrieving, by the computer processor from the service catalog, the service request and associated service provider attributes; dispatching, by the computer processor executing a mathematical optimization model, the service request to a data integration and API module; transmitting, by the computer processor executing the data integration and API module, the service request to a management module associated with a plurality of service providers; processing, by the computer processor executing the management module, the service request with respect to the plurality of service providers; managing, by the computer processor based on results of the processing the service request with respect to the plurality of service providers, inter process communications (IPC) associated with the service request; and managing, by the computer processor based on the IPC, an account associated with the service request and the plurality of service providers.

A third aspect of the invention provides a computer program product, comprising a computer readable hardware storage device storing a computer readable program code, the computer readable program code comprising an algorithm that when executed by a computer processor of a computing system implements a method, the method comprising: receiving, by the computer processor, a service request associated with an application, a product, or a service; processing, by the computer processor executing a service request module, the service request; submitting, by the computer processor, the service request to a service catalog; retrieving, by the computer processor from the service catalog, the service request and associated service provider attributes; dispatching, by the computer processor executing a mathematical optimization model, the service request to a data integration and API module; transmitting, by the computer processor executing the data integration and API module, the service request to a management module associated with a plurality of service providers; processing, by the computer processor executing the management module, the service request with respect to the plurality of service providers; managing, by the computer processor based on results of the processing the service request with respect to the plurality of service providers, inter process communications (IPC) associated with the service request; and managing, by the computer processor based on the IPC, an account associated with the service request and the plurality of service providers.

The present invention advantageously provides a simple method and associated system capable of combining services.

BRIEF DESCRIPTION OF THE DRAWINGS

FIG. 1, including FIGS. 1A, 1B, and 1C, illustrates a managing system comprising a centralized service broker component for aggregating and managing applications running in cloud and non-cloud environments, in accordance with embodiments of the present invention.

FIG. 2, including FIGS. 2A and 2B, illustrates an implementation example describing a service broker algorithm 200 enabled by the system of FIG. 1, in accordance with embodiments of the present invention.

DETAILED DESCRIPTION

Figure 1B:
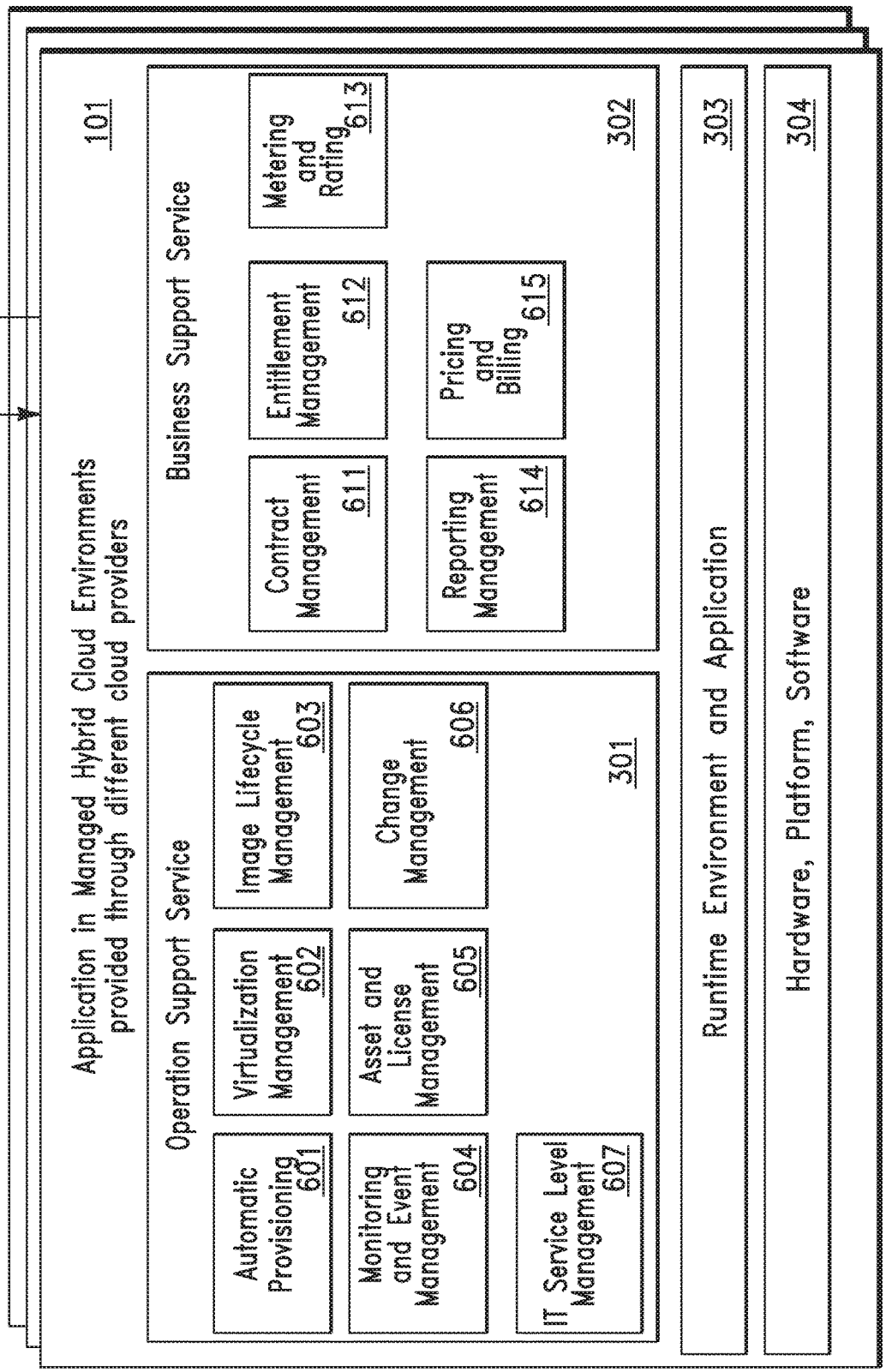

FIG. 1, including FIGS. 1A, 1B, and 1C, illustrates a managing system 2 comprising a centralized service broker component 100 for aggregating and managing applications running in cloud and non-cloud environments, in accordance with embodiments of the present invention. Centralized service broker component 100 is associated with a data aggregation service, comprehensive operation support services (OSS) and business support services (BSS). An intelligent service dispatcher (of managing system 2) intelligently dispatches (via an intelligent service dispatcher) service requests to associated service providers based on the following factors:

1. A mathematical optimization technique as described, infra.
2. Business and technical constraints associated with different service providers. For example, service level agreements (SLAs), capability, capacities, pricing, resource utilization, etc.
3. An overall business goal comprised by multiple business key performance indicators (KPI) such as, inter alia, operational cost, workload balance, etc.

Managing system 2 provides:

1. A single centralized view to request, dispatch, provision, and manage applications running in cloud environments and/or legacy non-cloud IT infrastructure.
2. A data aggregation service and a comprehensive operation support services (OSS) and business support services (BSS).
3. A configurable rule agent to configure flexible processes to request, dispatch, provision, and manage application services from a public cloud, a private cloud, and/or non-cloud environments.
4. A centralized end-to-end service lifecycle management mechanism to manage different application services from a cloud environment and/or legacy non-cloud IT infrastructure.

Centralized service broker component 100 effectively manages applications from cloud environments (e.g., private clouds, public clouds, hybrid clouds, etc.) and non-cloud environment via integration of different levels of application services thereby allowing users a single view for requesting and managing the applications running in cloud environments or legacy non-cloud IT infrastructure. Centralized service broker component 100 includes a data service layer and an OSS and BSS service layer. Key OSS and BSS components within a centralised managed environment are comprised by centralized service broker component 100.

Managing system 2 illustrates a detailed architecture design view of centralized service broker component 100 connected to a cloud based system 101 and a non-cloud based system 102. Centralized service broker component 100 comprises a client service portal 201, an OSS integration function component 202, a BSS integration function component 203, and a data broker/API function component 204. OSS Integration component 202 includes a service request management function component 501, a service catalog function component 502, an incident/problem management function component 503, a change management function component 504, an asset/license management function component 505, an intelligent dispatcher component 506, a rule agent 507, and a lifecycle management component 508. BSS integration component 203 includes a pricing/billing function 511, a reporting management function 512, a customer account management function 513, and an entitlement management function 514. If any users request specific requirements not covered in the defaulted OSS and BSS functions, they may extend the OSS and BSS functionalities through open service APIs.

Cloud based system 101 may comprise a private or public cloud environment comprising an application. Cloud based system 101 may include an OSS function component 301, a BSS function component 302, a runtime environment component 303, and a hardware/software/platform 304. OSS component 301 includes an automatic provisioning function component 601, a virtualization management function component 602, an image lifecycle management function component 603, a monitoring and event management component 604, an asset and license management component 605, a change management function component 606, and an IT service level management function component 607. BSS function component 302 includes a contract management function component 611, an entitlement management component 612, a metering and rating function component 613, a reporting management function component 614, and a pricing and billing function component 615.

Non-cloud based system 102 is associated with a non-cloud hosting environment comprising a non-cloud application. Non-cloud based system 102 comprises an OSS function component 401, a BSS function component 402, a runtime environment component 403, and a hardware/software/platform 404. OSS function component 401 includes a provisioning function component 701, an image lifecycle management function component 702, a monitoring and event management component 703, an asset and license management component 704, a change management function component 705 and an IT service level management function component 706. BSS function component 402 includes a contract management function component 711, a pricing and billing function component 712, and a reporting management function component 713.

Figure 2A:
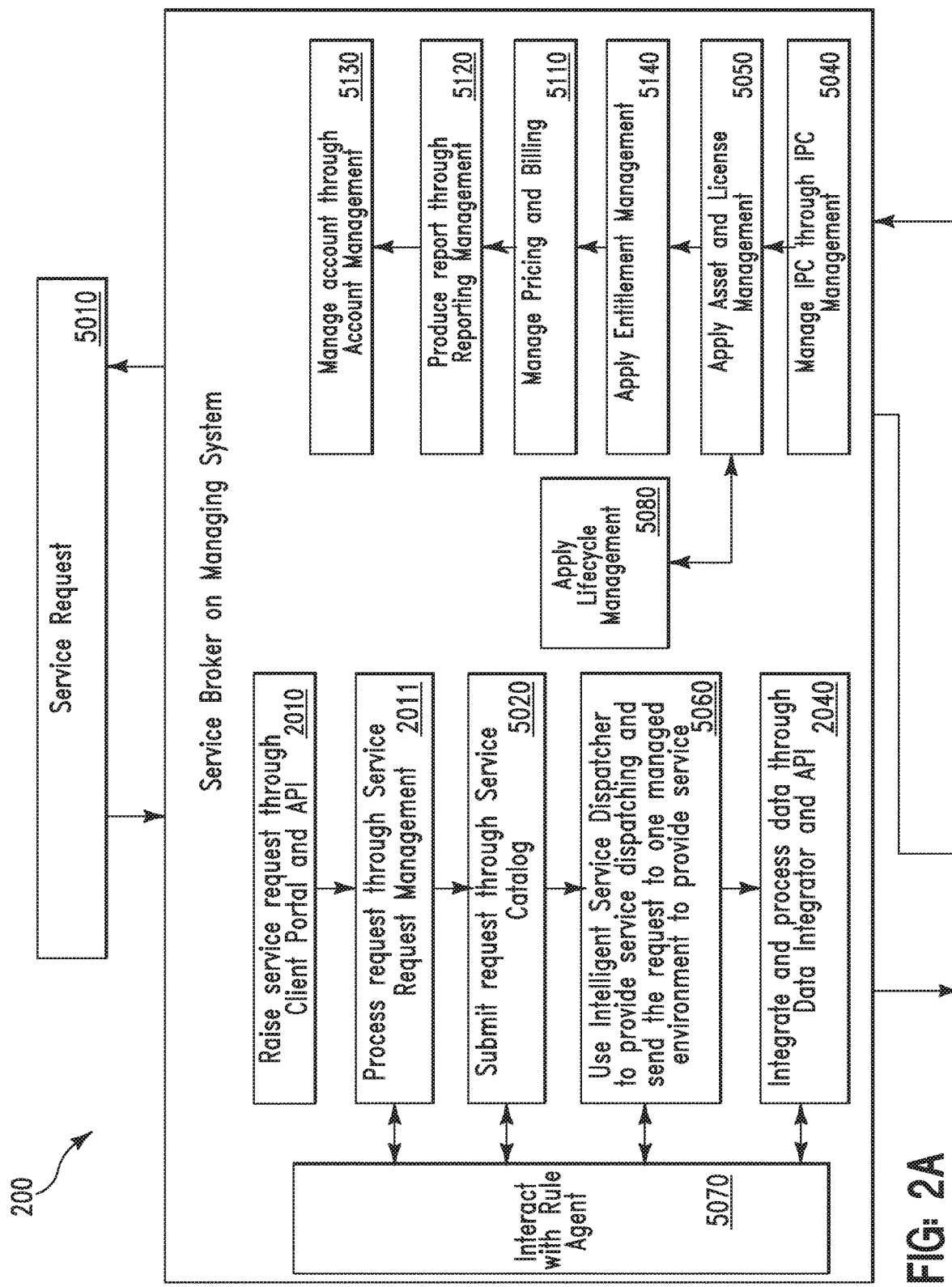

FIG. 2, including FIGS. 2A and 2B, illustrates an implementation example describing a service broker algorithm 200 enabled by system 2 of FIG. 1 for aggregating and managing applications (in a service broker) running in cloud and non-cloud environments, in accordance with embodiments of the present invention. In step 2010, a client raises a service request 5010 through a client portal and API component. In step 2011, service request 5010 is processed by a service request management component. In step, 5020, the processed service request 5010 is transmitted to a service catalog. A service catalog is defined herein as a centralized information hub including attributes of different service providers. For example, attributes may include, inter alia, an application service list, SLAs, capabilities, capacities, pricing models, resource utilization, etc. In step 5060, an intelligent service dispatcher retrieves data from a service request queue of a service request management component. Additionally, the attributes (stored in the service catalog) are retrieved and the service requests are dispatched based on a mathematical optimization model. In step 2040, the service requests are dispatched to a data integration and API component for interacting with managed Cloud or non-Cloud environments from different service providers. A rule agent 5070 executes and coordinates all processes between the service request management component, the service catalog component, the intelligent service dispatcher component, and the data integration/API component.

If the service request is transmitted (in step 2040) to a managed cloud environment 1010 (through APIs), a service provider provides automatic provisioning of a requested service in step 6010. In step 3040, the service provider, executes changes with respect to hardware, software, runtime functions, and/or applications associated with the requested service. In step 6040, monitoring and event management processes are applied to the executed changes. In step 6050, asset management processes are applied to the executed changes and the resulting assets are processed by a metering and rating component in step 6130. In step 6120, entitlement management processes are applied to the resulting assets and in step 6140, a resulting report is generated. In step 6150, resulting pricing is managed and in step 6020, a virtualization management component manages virtual components including an automatic provisioning component, hardware, software, runtime or application components, and an asset management component.

If the service request is transmitted (in step 2040) to a managed non-cloud environment 1020, the service provider provides a manual provisioning of a requested service in step 7010. In step 4030, the service provider, executes changes with respect to hardware, software, runtime functions, and/or applications associated with the requested service. In step 7030, monitoring and event management processes are applied to the executed changes. In step 7040, asset management processes are applied to the executed changes and in step 7130, a resulting report is generated. In step 7120, resulting pricing is managed.

After the service request is processed by the managed cloud environment 1010 or the managed non-cloud environment 1020, a resulting output is transmitted back to the service broker for IPC management in step 5030, asset/license management in step 5050, and entitlement management 5140 consolidated for service providers. A pricing and billing management step 5110 and a reporting management step 5120 are consolidated for different clients through account management step 5130.

In step 5080, a lifecycle management component integrates with the asset/license management 5050 step to perform a lifecycle management process for assets across environments. The Lifecycle management component comprises components of software. The software components poll trusted sources that provide notification of updates at firmware levels, OS patches and new releases, middleware patches and new releases, and analytics application updates and releases. A decision to apply updates and new releases is executed by an end user application owner and a process to apply updates and/or upgrade applications is dependent on the end user decision. For example, a service request for a current environment (full infra and applications stack) may be copied in a managed cloud. In response, the end user will create test data and proceed to apply and test the updates prior to replacing a production instance of modified application and infrastructure components.

Figure 3:
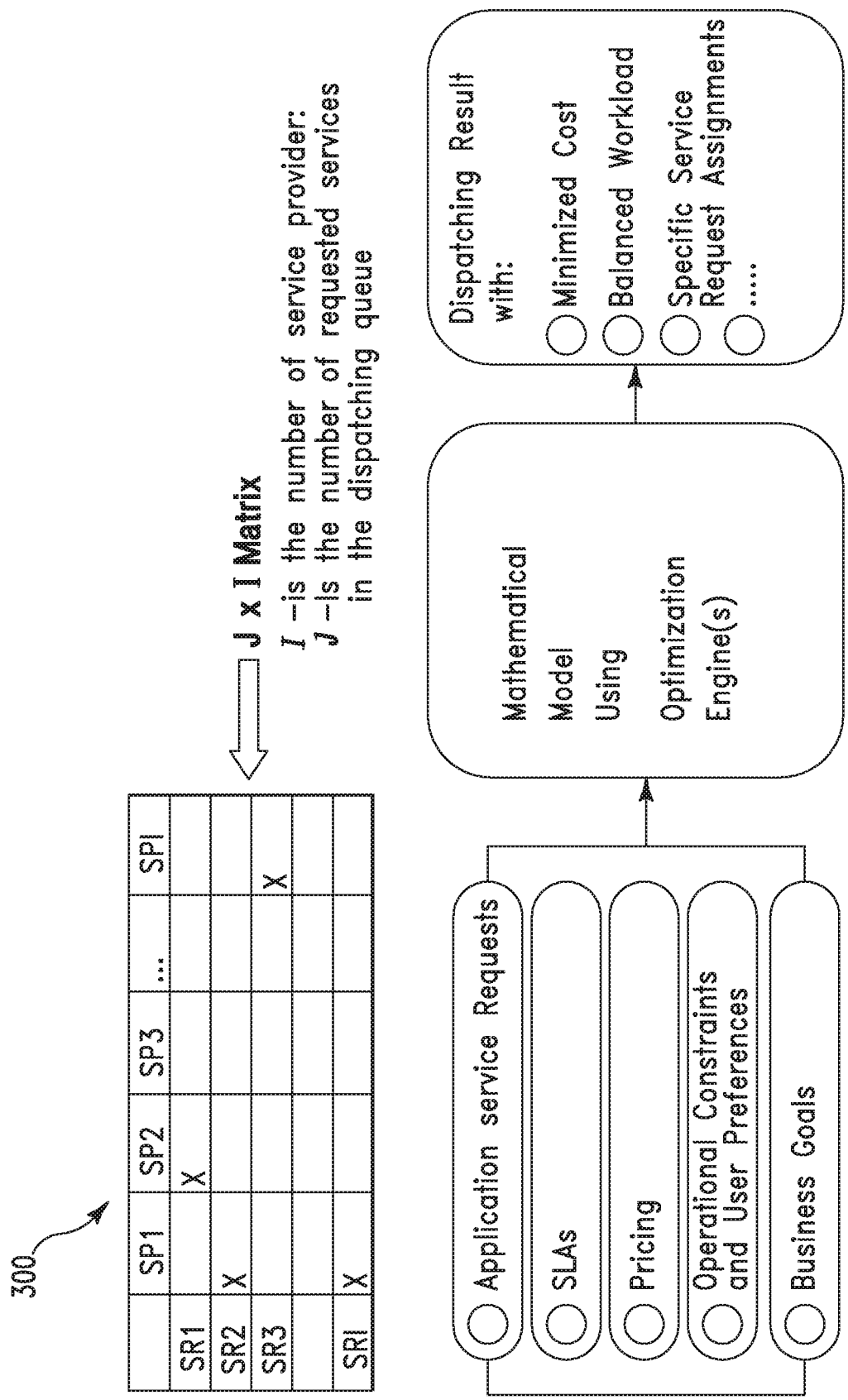
FIG. 3 illustrates an implementation example describing an intelligent service dispatcher executing a mathematical optimization model for dispatching service requests to service providers, in accordance with embodiments of the present invention.

FIG. 3 illustrates an implementation example 300 describing an intelligent service dispatcher executing a mathematical optimization model for dispatching service requests to service providers, in accordance with embodiments of the present invention. The mathematical optimization model is used to optimally dispatch the service requests to service providers to achieve an optimal business goal such as, inter alia, minimizing a total operational cost and balance a workload among different service providers. A mathematical optimization process comprises selecting a best element (with respect to specified criteria) from a set of available alternatives. For example, an optimization problem comprising maximizing or minimizing an objective function (e.g., a business goal) by systematically choosing input values from within an allowed set and computing a value of the objective function is provided. In response, the intelligent service dispatcher minimizes (via execution of an optimization model) an overall service operation cost via dispatching application service requests to an associated service provider. The optimization model includes two major portions: an objective function and constraints. The objective function comprises different business objectives (e.g., a sum of overall operation cost of requested services in a queue). Constraints are grouped as hard constraints (i.e., the constraints cannot be violated during service dispatching, e.g., a specified application service may be only provided by specific service providers) and soft constraints (i.e., a violation of the constraint results in some penalty, e.g., in order to balance a workload of different service providers, the dispatcher prefers to assign the service request to a service provider with lower utilization if the cost is the same).

The optimization model of the intelligent service dispatcher is defined as follows:

Indices:

$i \in \{1, \ldots, I\}$, where I comprises a number of service providers.

$j \in \{1, \ldots, J\}$, where J comprises a number of requested services in a dispatching queue.

Parameters:

$C_{i,j}$ comprises a cost of service j running in service provider. This parameter is provided by service provider.

$SLA_j$ comprises a required service level of service j. This parameter is configured by a user during requesting services.

$Cap_i$ comprises a maximum users number of services that may be assigned to the service provider i.

$S_{i,j}$ comprises a service level of which service provider i is able to commit to host application j. This parameter is provided by the service provider.

$L_{i,j}$ comprises a binary capacity matrix such that 1—service provider i comprises a capability to host application service j; and 0—service provider i does not comprise a capability to host application service j.

$P_{i,j}$ comprises a binary pre-assignment matrix such that 1—a user request comprises an application service j to be assigned to a service providing site i.

Variables $dvA_{i,j}$ comprises a binary matrix such that 1—Application service j is dispatched to service provider i; and 0—application service j is not dispatched to service provider i.

Objective Function:

An example of the objective function comprises minimizing a total service cost as follows:

Min $$\sum_{j=1}^{J} \sum_{i=1}^{I} C_{i,j} dvA_{i,j}$$

(i.e., overall service cost)

The objective function may be extended to include other business KPIs (e.g., service level, workload balance, etc.) subject to the following constraints:

1. Service level constraint such that the application service may be only dispatched to the service providers who are able to meet a required SLA as follows:

$$S_{i,j} dvA_{i,j} \geq SLA_j \ \forall \ i \in \{1, \ldots, I\}$$

2. Capability constraint such that some service providers do not have the capability to host the application services as follows:

$$L_{i,j} \geq dvA_{i,j} \ \forall \ i \in \{1, \ldots, I\}; j \in \{1, \ldots, J\}$$

3. Capacity constraint such that a number of application users in a service provider cannot exceed a specified number as follows:

$$Cap_i \geq \sum_{j=1}^{J} dvA_{i,j}$$

4. Pre-assignment constraint such that some application services must be hosted by a specific service provider based on user requirements as follows:

$$dvA_{i,j} \geq P_{i,j} \; \forall \; i \in \{1, \ldots, I\}; j \in \{1, \ldots, J\}$$

5. Position constraint such that only one application service on a queue is dispatched to a service provider as follows:

$$\sum_{i=1}^{I} dvA_{i,j} = 1$$

The above constraints comprise examples of typical constraints used in service dispatching. Any additional constraints may be used herein based on the modeling method described with respect to the figures.

Figure 4:
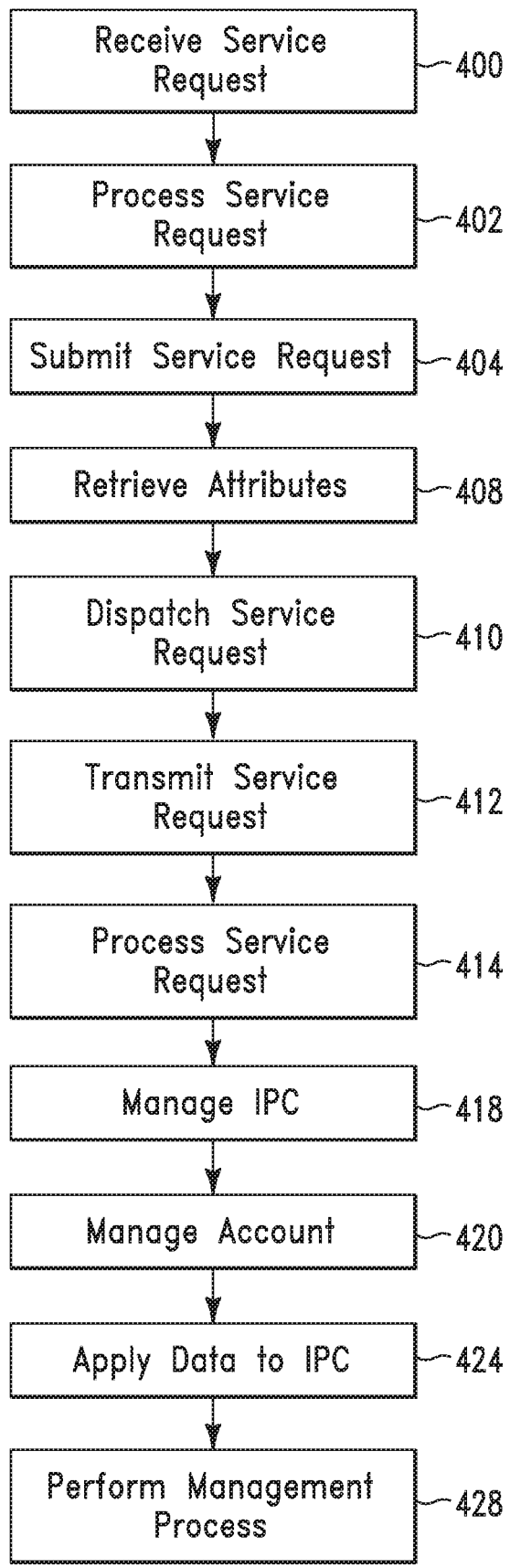
FIG. 4 illustrates an algorithm detailing a process flow enabled by the system of FIG. 1, in accordance with embodiments of the present invention.

FIG. 4 illustrates an algorithm detailing a process flow enabled by system 2 of FIG. 1 for aggregating and managing applications running in cloud and non-cloud environments, in accordance with embodiments of the present invention. Each of the steps in the algorithm of FIG. 4 may be enabled and executed in any order by a computer processor executing computer code. In step 400, a service request associated with an application, a product, and/or a service is received by a computer processor of a computing system. In step 402, the service request is processed. In step 404, the processed service request is submitted to a service catalog. In step 408, the service request and associated attributes are retrieved from the service catalog. In step 410, the service request is dispatched to a data integration and API module. In step 412, the service request is transmitted to a management module associated with a plurality of service providers. The management module may comprise a cloud based management module and/or a non-cloud based management module. In step 414, the service request is processed (by the management module) with respect to the plurality of service providers. If the management module comprises a cloud based management module then the following processing method is executed:
1. Automatically provisioning the service request.
2. Modifying hardware and software associated with service request based on the provisioning.
3. Managing a virtual image of the provisioning and the modifying.
4. Recording results of the modifying.
5. Generating pricing data associated with the modifying.
6. Generating a report indicating the results of modifying and the pricing data.

If the management module comprises a non-cloud based management module then the following processing method is executed:
1. Manually provisioning the service request.
2. Manually modifying hardware and software associated with service request based on the provisioning
3. Recording results of the modifying.
4. Generating pricing data associated with the modifying.

5. Generating a report indicating the results of modifying and the pricing data.

In step 418, inter process communications (IPC) associated with the service request are managed based on results of processing the service request with respect to the plurality of service providers. In step 420, an account associated with the service request and the plurality of service providers is managed based on the IPC. In step 424, a management process is performed as follows:
1. Asset and license management data and entitlement management data are applied to the IPC associated with the service request.
2. An end to end service lifecycle is managed across different infrastructure environments.
3. Pricing and billing information associated with the IPC is managed.

Figure 5:
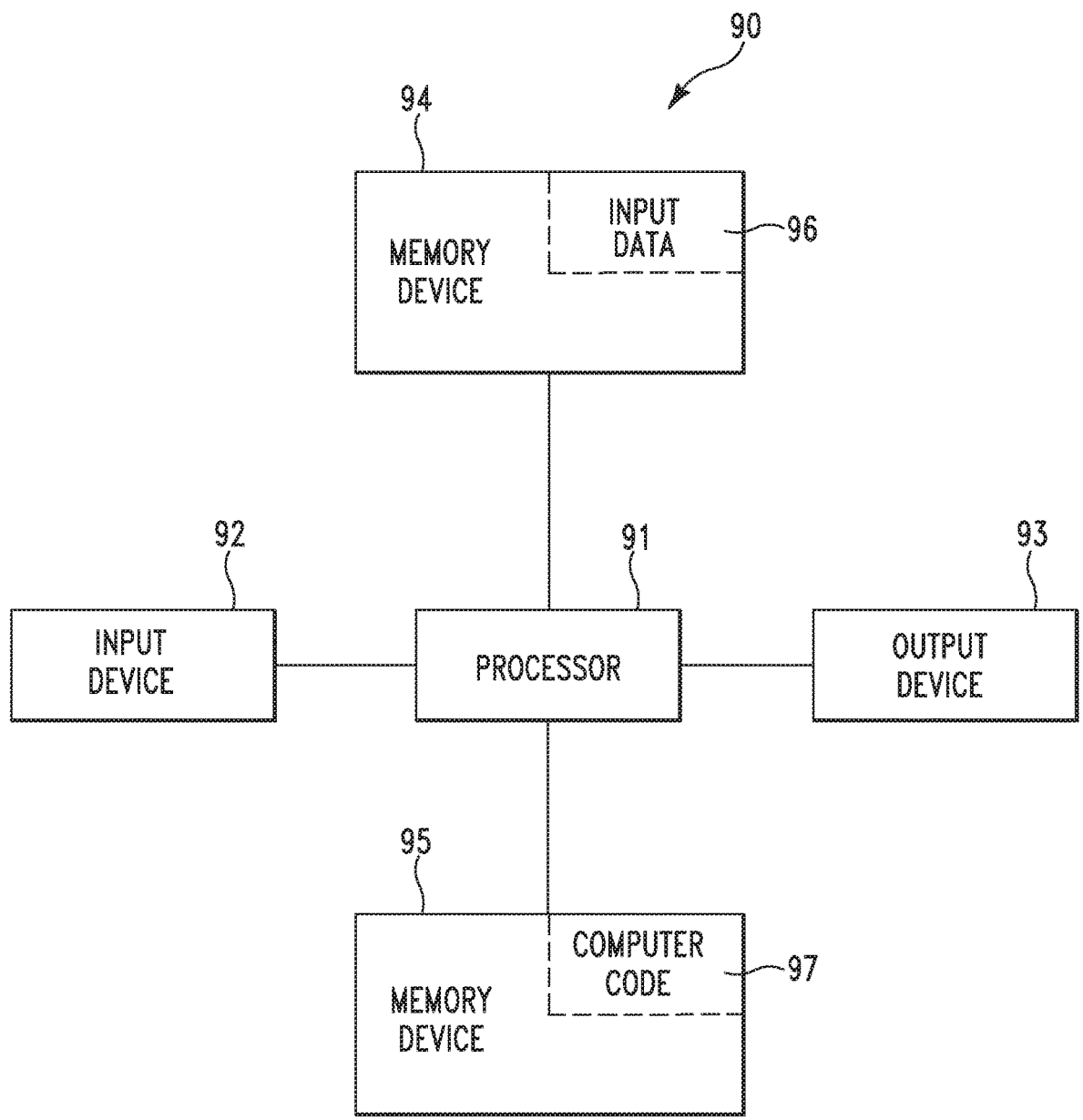
FIG. 5 illustrates a computer system used by or comprised by the system of FIG. 1 for aggregating and managing applications running in cloud and non-cloud environments, in accordance with embodiments of the present invention.

FIG. 5 illustrates a computer system 90 used by or comprised by the system of FIG. 1 for aggregating and managing applications running in cloud and non-cloud environments, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 4) for aggregating and managing applications running in cloud and non-cloud environments. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithms of FIGS. 2 and 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to aggregate and manage applications running in cloud and non-cloud environments. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for monitoring, measuring, and tracking costs and benefits associated with an IT infrastructure. In another embodiment, the invention provides a business method that performs the process steps of the invention on a subscription, advertising, and/or fee basis. That is, a service supplier, such as a Solution Integrator, could offer to aggregate and manage applications running in cloud and non-cloud environments. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software application management method comprising:
   receiving, by a computer processor of a computing system via a portal and an API component, a service request associated with an application, a product, or a service;
   submitting, by said computer processor, said service request to a service catalog associated with a hub component controlling resource utilization;
   retrieving, by said computer processor from said service catalog via a queue of a service request management component, said service request and associated service provider attributes;
   dispatching, by said computer processor executing a mathematical optimization model, said service request to a data integration and API module configure to interact with a managed cloud based system;
   transmitting, by said computer processor executing said data integration and API module, said service request to a management module associated with a plurality of service providers;
   managing, by said computer processor based on results of said processing said service request with respect to said plurality of service providers, inter process communications (IPC) associated with said service request;
   managing, by said computer processor based on said IPC, an account associated with said service request and said plurality of service providers;
   automatically provisioning said service request;
   modifying based on results of said provisioning, hardware and software associated with said service request, wherein said modifying comprises;
      executing changes to hardware, software, runtime functions, and applications of said managed cloud based system;
      monitoring executed changes to said hardware, software, runtime functions, and applications of said managed cloud based system;
      executing changes to hardware, software, runtime functions, and applications of a non-cloud based system;
      monitoring executed changes to said hardware, software, runtime functions, and applications of said non-cloud based system;
   polling, by said processor executing software components of a lifecycle management component, hardware and software sources providing notifications with respect to software updates at firmware levels, operating system patches and new releases, middleware patches and new releases, and analytics application updates and releases;
   applying, by said software components of said lifecycle management component, updates and upgrades to software applications resulting in modified application and infrastructure components;
   applying, by said processor, monitoring processes to said modified application and infrastructure components;
   testing, by said processor, said modified application and infrastructure components with respect to said monitoring processes;
   provisioning, by said processor, said modified application with respect to said infrastructure components; and
   enabling, based on results of said testing and said provisioning, said modified application and infrastructure components.

2. The method of claim 1, wherein said management module comprises a cloud environment management module, and wherein said processing said service request with respect to said plurality of service providers comprises:
   managing a virtual image of said provisioning and said modifying;
   recording results of said modifying;
   generating pricing data associated with said modifying; and
   generating a report indicating said results of said modifying and said pricing data.

3. The method of claim 1, wherein said management module comprises a non-cloud environment management module, and wherein said processing said service request with respect to said plurality of service providers comprises:
   manually provisioning said service request;
   manually modifying based on results of said provisioning, hardware and software associated with said service request;
   recording results of said modifying;
   generating pricing data associated with said modifying; and
   generating a report indicating said results of said modifying and said pricing data.

4. The method of claim 1, further comprising:
   applying, by said computer processor, asset and license management data to said IPC associated with said service request;
   applying, by said computer processor, entitlement management data to said IPC associated with said service request;
   managing, by said computer processor, an end-to-end service lifecycle across different infrastructure environments; and
   managing, by said computer processor, pricing and billing information associated with said IPC associated with said service request, wherein said managing said account is further based on results of: said applying said asset and license management data, said applying said entitlement management data, and said managing said pricing and billing information.

5. The method of claim 1, wherein said submitting, said retrieving, and said dispatching are based on interactions with rules generated by a configurable rule agent.

6. The method of claim 1, wherein said service catalog comprises a centralized information hub comprising said associated service provider attributes.

7. The method of claim 1, wherein said associated service provider attributes comprise attributes selected from the group consisting of application service lists, service level agreements, capabilities, capacities, pricing models, and resource utilization values.

8. The method of claim 1, further comprising:
providing at least one support service for at least one of creating, integrating, hosting, maintaining, and deploying computer-readable code in the computing system, said code being executed by the computer processor to implement: said receiving, said submitting, said retrieving, said dispatching, said transmitting, said managing said IPC, and said managing said account.

9. A computing system comprising a computer processor coupled to a computer-readable memory unit, said memory unit comprising instructions that when executed by the computer processor implements a software application management method comprising:
receiving, by said computer processor via a portal and an API component, a service request associated with an application, a product, or a service;
submitting, by said computer processor, said service request to a service catalog associated with a hub component controlling resource utilization;
retrieving, by said computer processor from said service catalog via a queue of a service request management component, said service request and associated service provider attributes;
dispatching, by said computer processor executing a mathematical optimization model, said service request to a data integration and API module configure to interact with a managed cloud based system;
transmitting, by said computer processor executing said data integration and API module, said service request to a management module associated with a plurality of service providers;
managing, by said computer processor based on results of said processing said service request with respect to said plurality of service providers, inter process communications (IPC) associated with said service request;
managing, by said computer processor based on said IPC, an account associated with said service request and said plurality of service providers;
automatically provisioning said service request;
modifying based on results of said provisioning, hardware and software associated with said service request, wherein said modifying comprises:
 executing changes to hardware, software, runtime functions, and applications of said managed cloud based system;
 monitoring executed changes to said hardware, software, runtime functions, and applications of said managed cloud based system;
 executing changes to hardware, software, runtime functions, and applications of a non-cloud based system;
 monitoring executed changes to said hardware, software, runtime functions, and applications of said non-cloud based system;
polling, by said processor executing software components of a lifecycle management component, hardware and software sources providing notifications with respect to software updates at firmware levels, operating system patches and new releases, middleware patches and new releases, and analytics application updates and releases;
applying, by said software components of said lifecycle management component, updates and upgrades to software applications resulting in modified application and infrastructure components;
applying, by said processor, monitoring processes to said modified application and infrastructure components;
testing, by said processor, said modified application and infrastructure components with respect to said monitoring processes;
provisioning, by said processor, said modified application with respect to said infrastructure components; and
enabling, based on results of said testing and said provisioning, said modified application and infrastructure components.

10. The computing system of claim 9, wherein said management module comprises a cloud environment management module, and wherein said processing said service request with respect to said plurality of service providers comprises:
managing a virtual image of said provisioning and said modifying;
recording results of said modifying;
generating pricing data associated with said modifying; and
generating a report indicating said results of said modifying and said pricing data.

11. The computing system of claim 9, wherein said management module comprises a non-cloud environment management module, and wherein said processing said service request with respect to said plurality of service providers comprises:
manually provisioning said service request;
manually modifying based on results of said provisioning, hardware and software associated with said service request;
recording results of said modifying;
generating pricing data associated with said modifying; and
generating a report indicating said results of said modifying and said pricing data.

12. The computing system of claim 9, wherein said method further comprises:
applying, by said computer processor, asset and license management data to said IPC associated with said service request;
applying, by said computer processor, entitlement management data to said IPC associated with said service request;
managing, by said computer processor, an end-to-end service lifecycle across different infrastructure environments; and
managing, by said computer processor, pricing and billing information associated with said IPC associated with said service request, wherein said managing said account is further based on results of: said applying said asset and license management data, said applying said entitlement management data, and said managing said pricing and billing information.

13. The computing system of claim 9, wherein said submitting, said retrieving, and said dispatching are based on interactions with rules generated by a configurable rule agent.

14. The computing system of claim 9, wherein said service catalog comprises a centralized information hub comprising said associated service provider attributes.

15. The computing system of claim 9, wherein said associated service provider attributes comprise attributes selected from the group consisting of application service lists, service level agreements, capabilities, capacities, pricing models, and resource utilization values.

16. A computer program product, comprising a computer readable hardware storage device storing a computer readable program code, said computer readable program code comprising an algorithm that when executed by a computer processor of a computing system implements a software application management method, said method comprising:
- receiving, by said computer processor via a portal and an API component, a service request associated with an application, a product, or a service;
- submitting, by said computer processor, said service request to a service catalog associated with a hub component controlling resource utilization;
- retrieving, by said computer processor from said service catalog via a queue of a service request management component, said service request and associated service provider attributes;
- dispatching, by said computer processor executing a mathematical optimization model, said service request to a data integration and API module configure to interact with a managed cloud based system;
- transmitting, by said computer processor executing said data integration and API module, said service request to a management module associated with a plurality of service providers;
- managing, by said computer processor based on results of said processing said service request with respect to said plurality of service providers, inter process communications (IPC) associated with said service request;
- managing, by said computer processor based on said IPC, an account associated with said service request and said plurality of service providers;
- automatically provisioning said service request;
- modifying based on results of said provisioning, hardware and software associated with said service request, wherein said modifying comprises;
  - executing changes to hardware, software, runtime functions, and applications of said managed cloud based system;
  - monitoring executed changes to said hardware, software, runtime functions, and applications of said managed cloud based system;
  - executing changes to hardware, software, runtime functions, and applications of a non-cloud based system;
  - monitoring executed changes to said hardware, software, runtime functions, and applications of said non-cloud based system;
- polling, by said processor executing software components of a lifecycle management component, hardware and software sources providing notifications with respect to software updates at firmware levels, operating system patches and new releases, middleware patches and new releases, and analytics application updates and releases;
- applying, by said software components of said lifecycle management component, updates and upgrades to software applications resulting in modified application and infrastructure components;
- applying, by said processor, monitoring processes to said modified application and infrastructure components;
- testing, by said processor, said modified application and infrastructure components with respect to said monitoring processes;
- provisioning, by said processor, said modified application with respect to said infrastructure components; and
- enabling, based on results of said testing and said provisioning, said modified application and infrastructure components.

17. The computer program product of claim 16, wherein said management module comprises a cloud environment management module, and wherein said processing said service request with respect to said plurality of service providers comprises:
- managing a virtual image of said provisioning and said modifying;
- recording results of said modifying;
- generating pricing data associated with said modifying; and
- generating a report indicating said results of said modifying and said pricing data.

18. The computer program product of claim 16, wherein said management module comprises a non-cloud environment management module, and wherein said processing said service request with respect to said plurality of service providers comprises:
- manually provisioning said service request;
- manually modifying based on results of said provisioning, hardware and software associated with said service request;
- recording results of said modifying;
- generating pricing data associated with said modifying; and
- generating a report indicating said results of said modifying and said pricing data.

19. The computer program product of claim 16, wherein said method further comprises:
- applying, by said computer processor, asset and license management data to said IPC associated with said service request;
- applying, by said computer processor, entitlement management data to said IPC associated with said service request;
- managing, by said computer processor, an end-to-end service lifecycle across different infrastructure environments; and
- managing, by said computer processor, pricing and billing information associated with said IPC associated with said service request, wherein said managing said account is further based on results of: said applying said asset and license management data, said applying said entitlement management data, and said managing said pricing and billing information.

20. The computer program product of claim 16, wherein said submitting, said retrieving, and said dispatching are based on interactions with rules generated by a configurable rule agent.

* * * * *